(12) United States Patent
Koshino et al.

(10) Patent No.: US 7,363,341 B2
(45) Date of Patent: Apr. 22, 2008

(54) RELAY APPARATUS, METHOD OF CONTROLLING CONTENT DELIVERY, AND CONTENT DELIVERY SYSTEM

(75) Inventors: Masayuki Koshino, Fujisawa (JP); Mayu Yamada, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 889 days.

(21) Appl. No.: 10/718,719

(22) Filed: Nov. 24, 2003

(65) Prior Publication Data

US 2004/0110484 A1 Jun. 10, 2004

(30) Foreign Application Priority Data

Dec. 4, 2002 (JP) .............................. 2002-352170

(51) Int. Cl.
*G06F 15/16* (2006.01)
(52) U.S. Cl. ...................... 709/203; 709/218
(58) Field of Classification Search ..................... None
See application file for complete search history.

(56) References Cited

U.S. PATENT DOCUMENTS

| | | | | |
|---|---|---|---|---|
| 6,519,235 | B1* | 2/2003 | Kim et al. | 370/331 |
| 6,801,526 | B1* | 10/2004 | Stahl et al. | 370/352 |
| 7,025,209 | B2* | 4/2006 | Hawkins | 209/217 |
| 7,158,497 | B2* | 1/2007 | Li et al. | 370/331 |
| 2002/0012328 | A1* | 1/2002 | Emanuel et al. | 370/328 |
| 2002/0026482 | A1* | 2/2002 | Morishige et al. | 709/206 |
| 2003/0027554 | A1* | 2/2003 | Haumont | 455/414 |
| 2003/0125021 | A1* | 7/2003 | Tell et al. | 455/426 |
| 2003/0185190 | A1* | 10/2003 | Chitrapu et al. | 370/338 |
| 2004/0017798 | A1* | 1/2004 | Hurtta et al. | 370/352 |

FOREIGN PATENT DOCUMENTS

| | | |
|---|---|---|
| JP | 11-112664 | 4/1999 |
| JP | 11-113058 | 4/1999 |
| JP | 2001-265689 | 9/2001 |
| JP | 2001-285332 | 10/2001 |
| JP | 2002-165262 | 6/2002 |
| JP | 2002-344920 | 11/2002 |
| WO | WO 01/91370 A2 | 11/2001 |

OTHER PUBLICATIONS

Li Yingjie, et al., "Effective Web Caching for GPRS Networks", Computer Networks and Mobile Computer, IEEE, XP-010565878, Oct. 16, 2001, pp. 85-90.
Nillo Musikka, et al., "Ericsson's IP-based BSS and radio network server", Ericsson Review, vol. 77, No. 4, XP-000969930, 2000, pp. 224-233.
Roger Kalden, et al., "Wireless Internet Access Based on GPRS", IEEE Personal Communications, vol. 7, No. 2, XP-000920359, Apr. 2000, pp. 8-18.

* cited by examiner

*Primary Examiner*—John B. Walsh
(74) *Attorney, Agent, or Firm*—Oblon, Spivak, McClelland, Maier & Neustadt, P.C.

(57) ABSTRACT

The present invention includes a RAN connection receiving section, an IP packet processing section, and a local content server. The RAN connection receiving section receives content request information from a mobile terminal. When a RAN identifier and an IP address included in the content request information are identified in a set table based on the content request information received by the RAN connection receiving section, the IP packet processing section transfers the content request information to the identified IP address. The local content server delivers content information corresponding with to the content request information to the mobile terminal.

6 Claims, 9 Drawing Sheets

FIG. 4

| RAN IDENTIFIER | CORE IDENTIFIER |
|---|---|
| ----- | ----- |
| ----- | ----- |
| ----- | ----- |

FIG. 5

| RAN IDENTIFIER | CONNECTION INFORMATION | | | |
|---|---|---|---|---|
| | USE / NOT USE | SEND OF ADVERTISING MESSAGE | ACCOUNTING | OTHERS |
| #1 | IN USE | NOT SENT | NOT CHARGED | |
| ----- | ----- | ----- | ----- | ----- |
| #n | IN USE | SENT | CHARGED | ----- |

FIG. 6

| LOCAL CONTENT SERVER IP ADDRESS |
|---|
| #10 |
| #20 |
| #30 |
| ⋮ |

FIG. 7

| LOCAL CONTENT SERVER NAME | LOCAL CONTENT SERVER IP ADDRESS |
|---|---|
| A | #1 |
| B | #2 |
| C | #3 |
| ⋮ | ⋮ |

FIG. 8

| ADVERTISING MESSAGE | | |
|---|---|---|
| DESTINATION IP ADDRESS | SOURCE IP ADDRESS | DATA SECTION |
| CONTENT REQUEST INFORMATION | | |
| DESTINATION IP ADDRESS | SOURCE IP ADDRESS | DATA SECTION |

FIG. 10

| SOURCE IP ADDRESS | RAN IDENTIFIER |
|---|---|
| -------- | -------- |
| -------- | -------- |
| -------- | -------- |

FIG. 11

| IP ADDRESS IDENTIFYING MOBILE TERMINAL |
|---|
| -------- |
| -------- |
| -------- |

FIG. 12

| ACCOUNTING ADDITIONAL INFORMATION | | | |
|---|---|---|---|
| RAN IDENTIFIER | ACCOUNTING INFORMATION | OTHER CONTROL INFORMATION | IP PACKET |

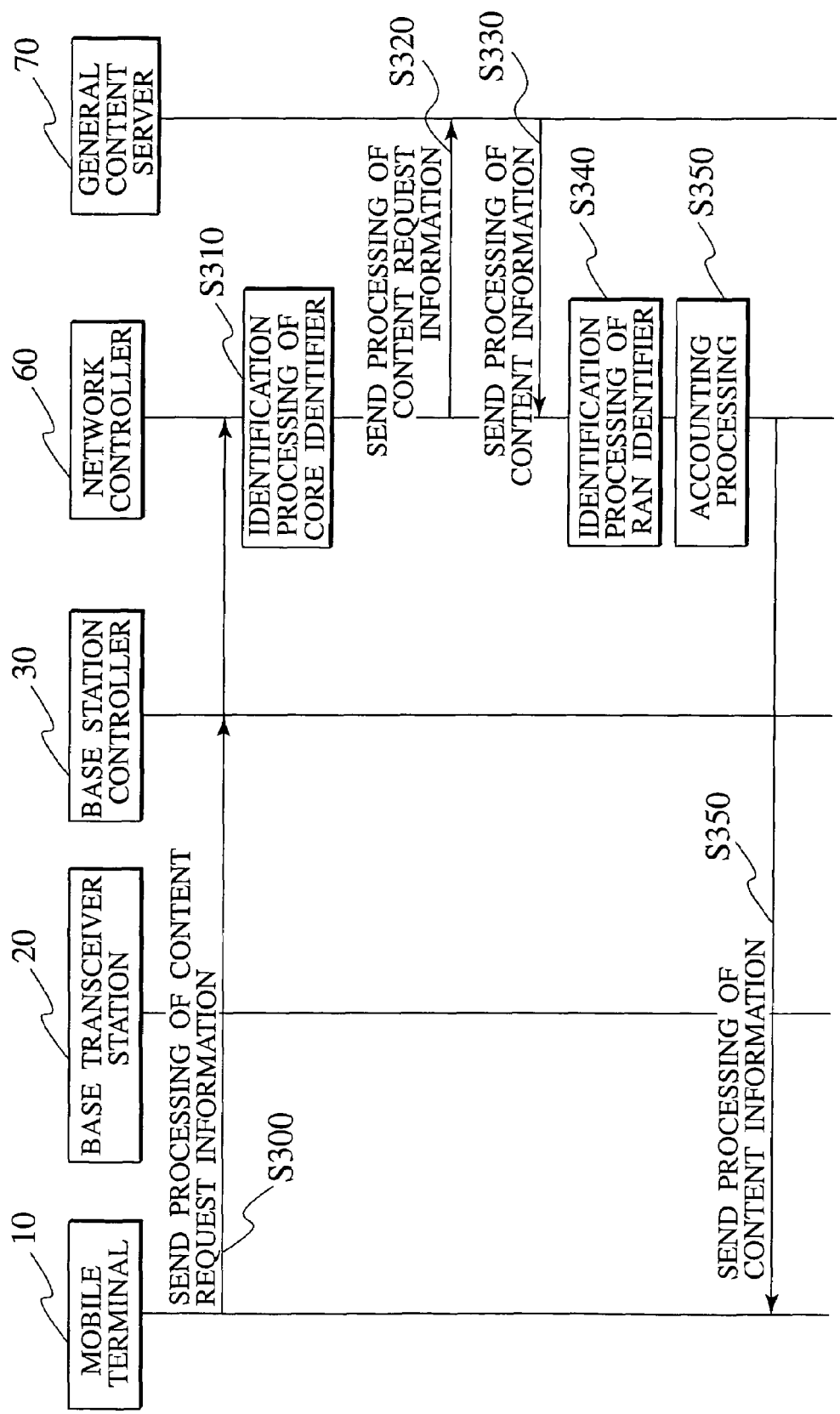

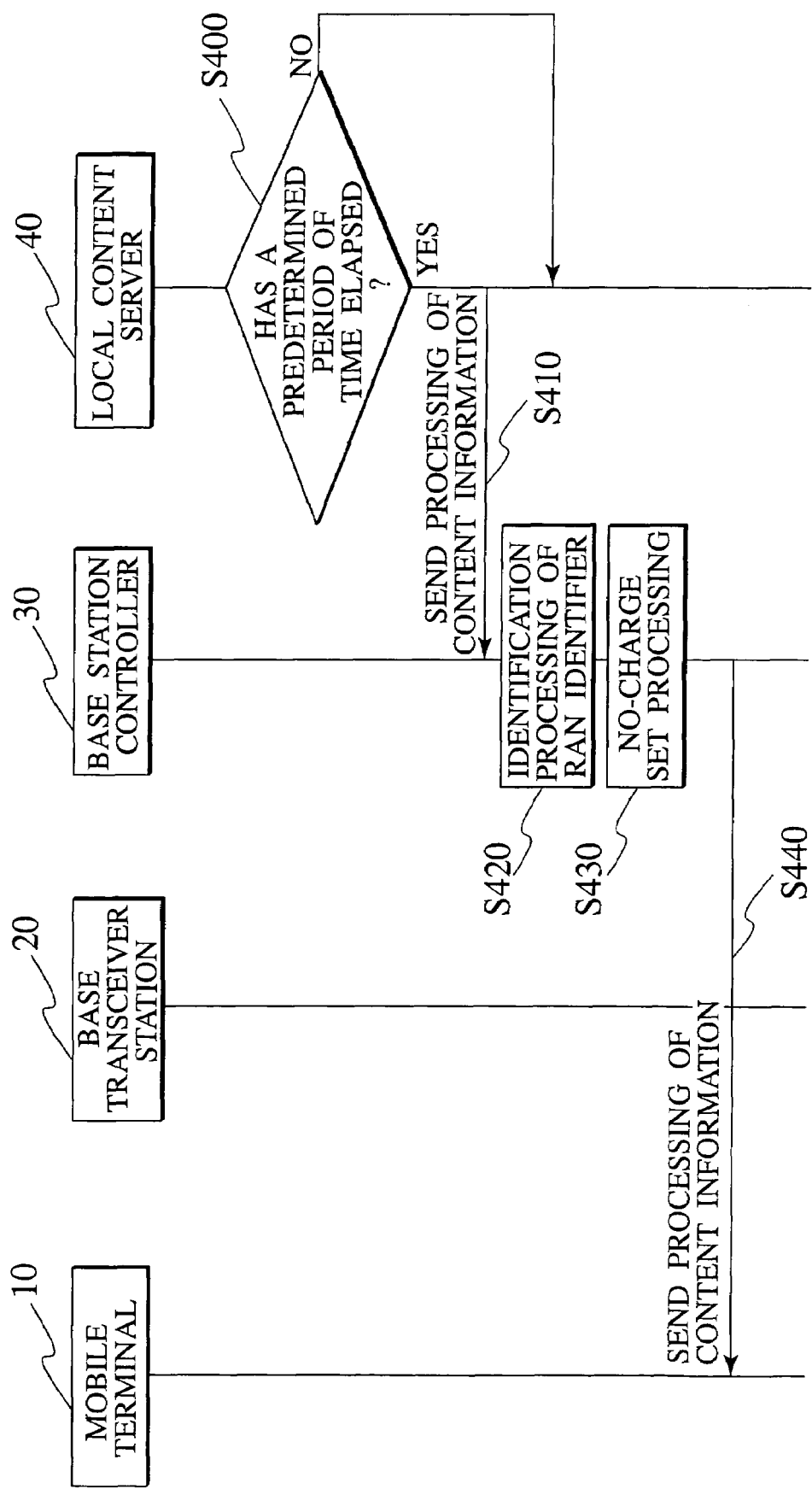

RELAY APPARATUS, METHOD OF CONTROLLING CONTENT DELIVERY, AND CONTENT DELIVERY SYSTEM

CROSS REFERENCE TO RELATED APPLICATIONS

This application is based upon and claims the benefit of priority from the prior Japanese Patent Applications No. P2002-352170, filed on Dec. 12, 2002: the entire contents of which are incorporated herein by reference.

BACKGROUND OF THE INVENTION

1. Field of the Invention

The present invention relates to a relay apparatus, a method of controlling content delivery and a content delivery system, in which a mobile terminal and the relay apparatus are connected to a radio network including a RAN (Radio Access Network). A content server which delivering various contents to the mobile terminal is located on a private network, is connected to the relay apparatus, and delivers the contents to the mobile terminal via the relay apparatus.

2. Description of the Related Art

A system has hitherto been proposed, in which a mobile terminal receives a content of interest via a network from a content server managing various contents (for example, see Patent Literature 1). In a system including a base transceiver station (Node B) and a base station controller (RNC) which is compliant with 3GPP standards as a mode of RAN, a mobile terminal needs to receive delivery of a content of interest from a content server always via a core network.

Patent Literature 1: Japanese Patent Laid-Open Publication No. 2001-265689 (claims 4 to 6, FIG. 1)

However, in this system, when an operator installing a RAN independently sets a content server to provide services, the operator needs to have a network operator having a core network make settings to allow connection of the content server to the core network. Therefore, it took much time and labor for the operator to complete the above system.

In the above system, a mobile terminal is required to receive a content of interest from the content server always via the core network. Accordingly, the operator could not provide a service of delivering original contents, not via the core network, to a mobile terminal just being connected to a RAN (especially, RAN compliant with 3GPP) that is not connected to the core network.

Furthermore, data sent and received between a mobile terminal and the content server is always routed through the core network similarly to data sent and received between the mobile terminal and a general content server connected to the Internet. Therefore, when the mobile terminal receives data of interest from the above content server, a user thereof must pay a certain fee according to an amount of delivered data.

SUMMARY OF THE INVENTION

Therefore, the present invention was made in the light of the aforementioned points, and an object of the present invention is to provide a relay apparatus, a method of controlling content delivery, and a content delivery system, which allow a content server connected to a network on a private network to deliver a content of interest to a mobile terminal connected to a RAN, compliant with 3GPP in particular, via on the private network as distinct from a core network.

The present invention was made to attain the above object. In the present invention, the mobile terminal and the relay apparatus are connected to a radio network including the RAN (Radio Access Network), and a first content server located on the private network and delivering various contents is connected to the relay apparatus. When the content server delivers a content to the mobile terminal via the relay apparatus, a table including a radio connection identifier to identify a channel through which the content is sent and received between the mobile terminal and the relay apparatus and an IP address with which the content is sent and received between the relay apparatus and the first content server, is set in accordance with an instruction from the mobile terminal. Content request information is then received from the mobile terminal. When the radio connection identifier and the IP address included in the content request information are identified in the set table based on the received content request information, the content request information is transferred to the identified IP address. Based on the transferred content request information, the content made to correspond to the content request information is delivered to the mobile terminal via the relay apparatus.

According to the present invention of this application as described above, the first content server can deliver contents only to the mobile terminal connected to the RAN via the network on the private network. Moreover, this eliminates the need for an operator who installs the first content server to make settings to allow connection of the first content server to a network on a wide area network (core network). Accordingly, the operator can reduce a period of time to complete the system.

In the present invention, a second content server located on the wide area network and delivering various contents is connected to the relay apparatus. The relay apparatus may transfer the content request information to the second content server when the IP address included in the content request information cannot be identified in the set table based on the received content request information. Based on the transferred content request information, the second content server may then deliver the content made to correspond to the content request information to the mobile terminal via the relay apparatus.

In this case, when the address included in the content request information received from the mobile terminal is the address of the second content server, the relay apparatus can transfer the content request information to the address. For example, when the address included in the content request information is the address of the first content server, the content request information is not routed via the second content server which charges a fee according to an amount of sent data. Accordingly, when the address of the first content server is included in the content request information, the operator can allow a user not to pay the fee according to the amount of sent data.

In the aforementioned present invention, when the content is delivered from the first content server, the user is not charged for the content, and when the content is delivered from the second content server, the user may be charged for the content according to the amount of content. In this case, since the relay apparatus charges fees only for contents delivered from the second content server, the operator of the first content server can deliver contents to the mobile terminal at no fee.

In the aforementioned present invention, a source address included in the content request information sent from the mobile terminal is stored, and a content may be sent to the stored source address via the relay apparatus when a predetermined period of time has elapsed. In this case, the first content server can deliver a content of interest to the mobile terminal which has made access at least once in the past when a predetermined period of time has elapsed.

Note that, when the radio connection identifier is set between the relay apparatus and the mobile terminal through the radio network, the IP address of the first content server may be sent to the mobile terminal.

Preferably, the relay apparatus inquires of a DNS server about a destination address corresponding to the name of the first content server which is previously stored. In this case, the relay apparatus can transfer the content request information received from the mobile terminal to the address, acquired from the DNS server, corresponding to the name.

A second relay apparatus which relays contents between the second content server and the relay apparatus is provided. The relay apparatus sets a second table including the radio access identifier to identify the channel through which a content is sent and received between the mobile terminal and the relay apparatus and a second identifier to identify a channel through which the content is sent and received between the relay apparatus and the second relay apparatus. Upon receipt of the content from the second relay apparatus with the second identifier set as described above, the relay apparatus may identify the radio connection identifier made to correspond to the second identifier in the set second table, and send the received content to the relevant mobile terminal using the identified radio connection identifier.

The relay apparatus sets the table including the radio connection identifier to identify the channel through which the content is sent and received between the mobile terminal and the relay apparatus and the IP address with which the content is sent and received between the relay apparatus and the first content server. Upon receipt of the content including the IP address from the first content server, the relay apparatus may identify the radio connection identifier made to correspond to the IP address in the set table, and send the received content to the relevant mobile terminal using the identified radio connection identifier.

BRIEF DESCRIPTION OF DRAWINGS

FIG. 4 is a table showing correspondence relations between RAN identifiers and CORE identifiers, which are stored in a correspondence table storing section in the embodiment.

FIG. 5 is a table showing contents of connection information in the embodiment.

FIG. 6 is a table showing contents of IP addresses of local content servers in the embodiment.

FIG. 7 is a table showing correspondence relations between local content server names and IP addresses of the local content servers in the embodiment.

FIG. 8 is a view showing contents of an advertising message and of content request information in the embodiment.

FIG. 10 is a table showing correspondence relations between source IP addresses and RAN identifiers in the embodiment.

FIG. 11 is a table showing IP addresses to identify mobile terminals in the embodiment.

FIG. 12 is a view showing contents of accounting additional information in the embodiment.

FIG. 13 is a chart showing a procedure for the mobile terminal acquiring content information from a general content server in the embodiment.

FIG. 14 is a chart showing a procedure for the local content server voluntarily sending content information to the mobile terminal in the embodiment.

DETAILED DESCRIPTION OF THE INVENTION

Figure 1:
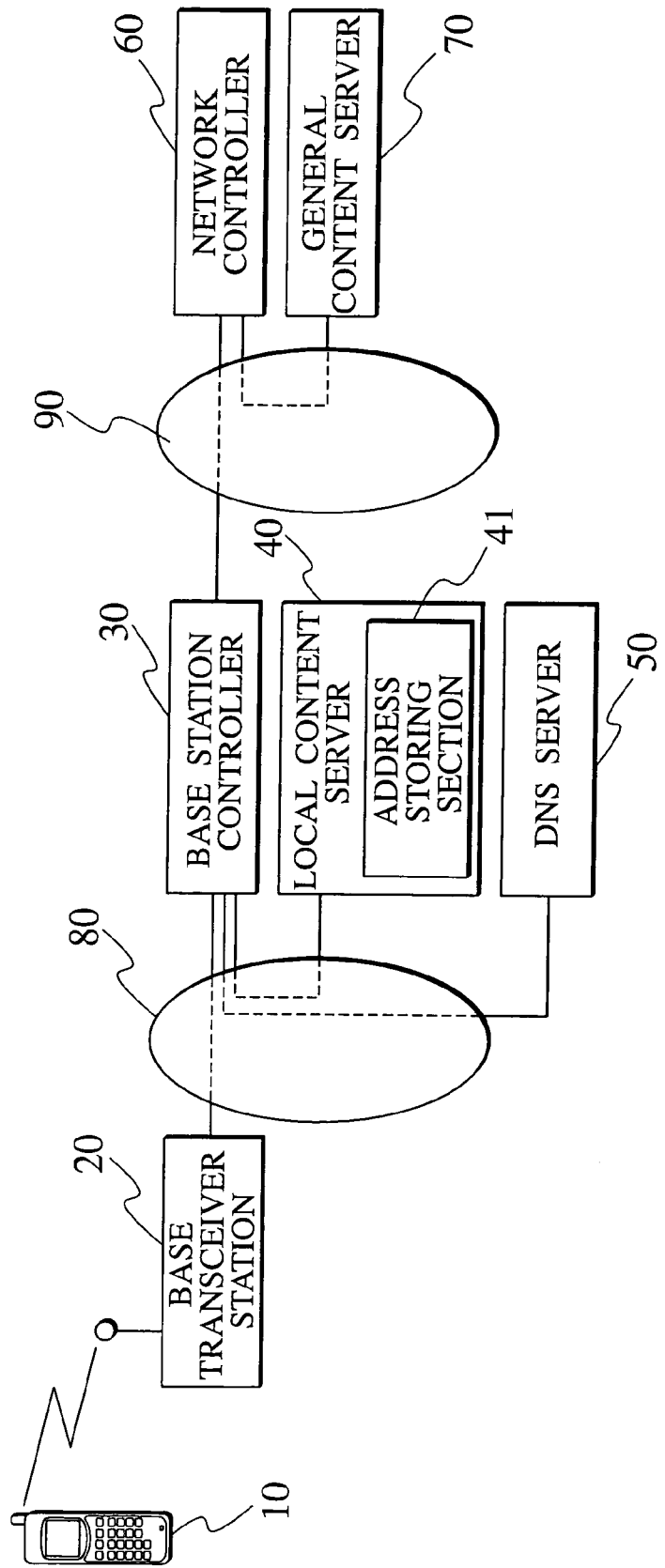
FIG. 1 is a view showing a schematic configuration of a content delivery system according to an embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Preferred Embodiments of the Invention)

(Basic Configuration of Content Delivery System)

A description will be given of a content delivery system according to the present invention with reference to the drawings. FIG. 1 is a view showing a schematic configuration of the content delivery system according to an embodiment.

As shown in FIG. 1, a mobile terminal 10 and a base station controller 30 are connected to an in-RAN network 80 (radio network or private network). A local content server 40 located on the in-RAN network 80 and delivering various contents is connected to the base station controller 30.

In the above content delivery system, the local content server 40 delivers contents to the mobile terminal 10 via the base station controller 30. In this embodiment, this content delivery system includes the mobile terminal 10, a base transceiver station 20, the base station controller (relay apparatus) 30, the local content server (first content server) 40, a DNS server 50, a network controller (second relay apparatus) 60, a general content server (second content server) 70, the in-RAN network 80, and an in-CORE network 90.

The mobile terminal 10 is equipment which receives content information from the local content server 40 or the general content server 70. This content information is information on advertisement composed of texts, images, or the like. This content information includes a destination IP address (IP address to identify the mobile terminal 10) to which the content information is sent, and the like.

The base transceiver station 20 is equipment which relays data sent and received between the mobile terminal 10 and the base station controller 30. The local content server 40 delivers various contents. This local content server 40 is connected to the network 80 on a private network.

The DNS server 50 is equipment which sends an IP address corresponding to a name of the local content server 40, the name being stored in the base station controller 30, to the base station controller 30 in response to inquiry from the base station controller 30. This DNS server 50 is connected to the network 80 on the private network.

In this embodiment, the local content server 40, the DNS server 50, and the base station controller 30 are connected to the network 80 on the private network. Note that, however, only the base station controller 30 and the base transceiver station 20 are also connected to a network 80 constructed of a RAN.

The base station controller 30 is equipment which relays data sent and received between the base transceiver station 20 and the network controller 60. Moreover, the base station controller 30 relays data sent and received between the base transceiver station 20 and the local content server 40.

Figure 2:
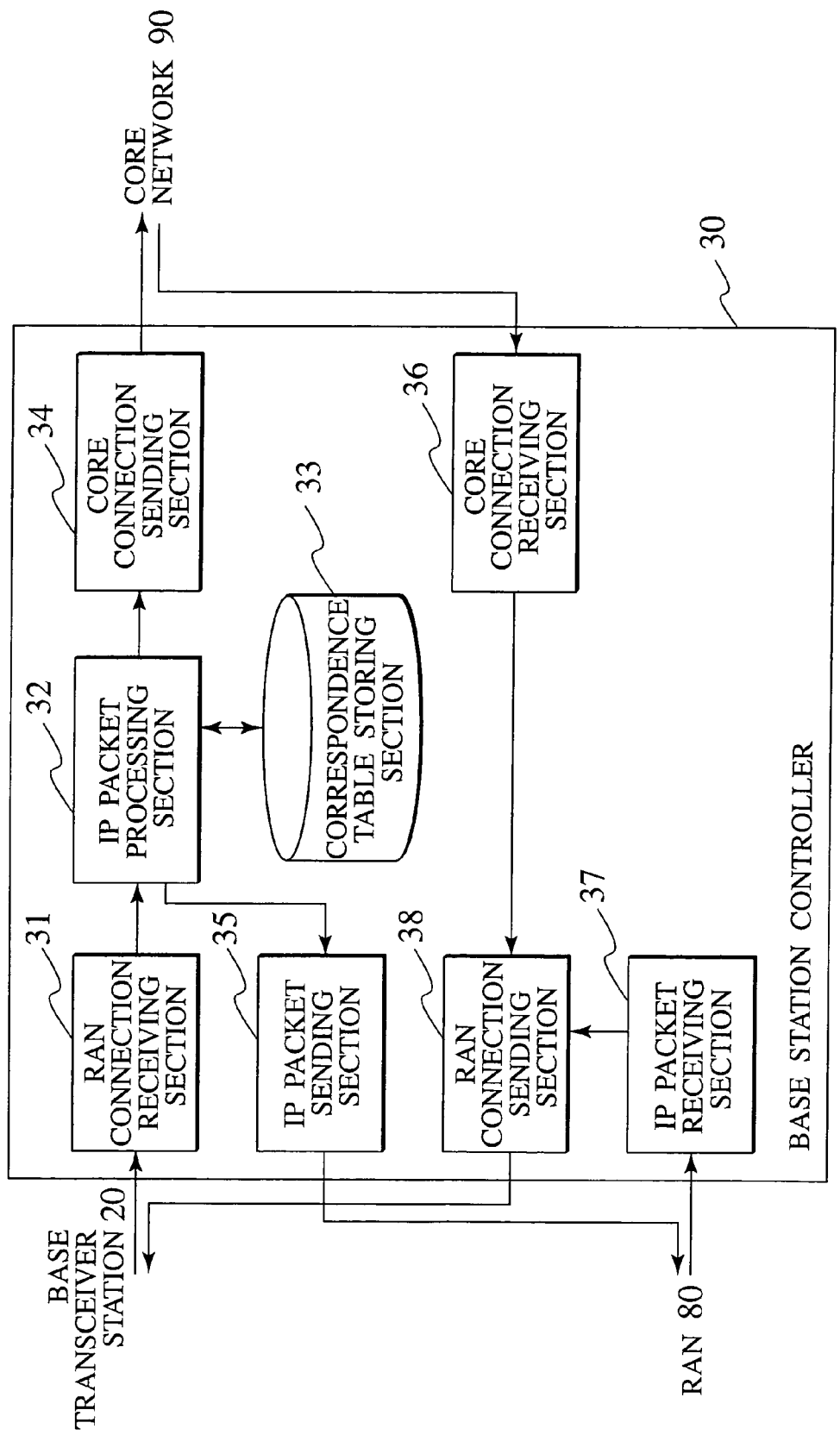
FIG. 2 is a view showing an internal structure of a base station controller in the embodiment.

FIG. 2 is a block diagram showing an internal structure of the base station controller 30. As shown in FIG. 2, the base station controller 30 includes a RAN connection receiving section 31, an IP packet processing section 32, a correspondence table storing section 33, a CORE connection sending section 34, an IP packet sending section 35, a CORE connection receiving section 36, an IP packet receiving section 37, and a RAN connection sending section 38. This base station controller 30 is connected to the network 80 on the private network and to the network 90 on a wide area network.

As shown in FIG. 2, the RAN connection receiving section 31 (receiving section), the IP packet processing section 32 (transfer section), and the CORE connection sending section 34 constitute a function to receive inbound packets. The CORE connection receiving section 36, the IP packet receiving section 37, and the RAN connection sending section 38 constitute a function to receive outbound packets.

The RAN connection receiving section 31 is a unit which makes communication connection between the RAN connection receiving section 31 and the base transceiver station 20. The RAN connection receiving section 31 which has made the communication connection receives content request information sent from the mobile terminal 10.

Herein, the content request information is an instruction to request content information of interest of the local content server 40 or the general content server 70. This content request information contains an IP address to identify the mobile terminal 10 which has sent this information, a destination IP address (IP address of the local content server 40 or the general content server 70) to which the content request information is sent, and the like.

When a RAN identifier is set between the base station controller 30 and the mobile terminal 10 through the network 80, the IP packet processing section 32 sends an advertising message including the IP address of the local content server 40 to the mobile terminal 10. The mobile terminal 10 sets the content request information, using the received advertising message. The mobile terminal 10 sends the set content request information to the IP packet processing section 32.

Based on the IP address of the local content server 40 included in the received content request information, this IP packet processing section 32 identifies an IP address corresponding to the IP address included in the content request information, in the correspondence table storing section 33. The IP packet processing section 32 transfers the content request information to the local content server 40 corresponding to the identified IP address. This transfer of the content request information to the local content server 40 allows the mobile terminal 10 to acquire the content information of interest from the local content server 40 (details will be described later).

Herein, the correspondence table storing section 33 stores a plurality of the RAN identifiers (radio access identifiers) to identify respective channels for sending and receiving data between the mobile terminal 10 and the base station controller 30, and a plurality of the IP addresses for sending and receiving data between the base station controller 30 and the local content server 40, with by corresponding the RAN identifiers with the IP addresses.

Moreover, the correspondence table storing section 33 stores a plurality of the RAN identifiers to identify the respective channels for sending and receiving data between the mobile terminal 10 and the base station controller 30, and a plurality of CORE identifiers (second identifiers) to identify respective channels for sending and receiving data between the base station controller 30 and the network controller 60, by corresponding the RAN identifiers with the CORE identifiers.

Note that, in accordance with an instruction from the mobile terminal 10, the IP packet processing section 32 (table setting section) sets the RAN identifier and the IP address of the local content server 40 corresponding with this RAN identifier, sets the RAN identifier and the CORE identifier corresponding with this RAN identifier, and causes the correspondence table storing section 33 to store a table including these identifiers.

When the IP packet processing section 32 cannot identify the IP address of the local content sever 40 included in the content request information in the table stored in the correspondence table storing section 33, the IP packet processing section 32 transfers the content request information to the general content server 70.

When the IP packet processing section 32 receives the content information including the IP address to identify the mobile terminal 10 from the local content server 40, the IP packet processing section 32 identifies the RAN identifier corresponding with the IP address in the table stored in the correspondence table storing section 33 and sends the received content information to the relevant mobile terminal 10 using the identified RAN identifier.

When the IP packet processing section 32 receives the content information including the CORE identifier from the network controller 60, the IP packet processing section 32 identifies the RAN identifier corresponding with the CORE identifier in the table stored in the correspondence table storing section 33 and sends the received content information to the relevant mobile terminal 10 using the identified RAN identifier.

The RAN connection sending section 38 is a unit which sends the content information received by the IP packet receiving section 37 or the content information received by the CORE connection receiving section 36 to the base transceiver station 20. When the content information is delivered from the local content server 40, the RAN connection sending section 38 executes processing not to charge a fee for the content thereof. When the content information is delivered from the general content server 70, the RAN connection sending section 38 executes processing to charge a fee according to an amount of the content information.

Herein, the correspondence table storing section 33 also stores the IP address to identify the mobile terminal 10 and a bank account of a user who owns the mobile terminal 10 in advance, by corresponding the IP address with the bank account.

Specifically, when charging a fee, the RAN connection sending section 38 identifies from the correspondence table storing section 33 a bank account corresponding with the IP address of the mobile terminal 10 to which the content information is delivered. This RAN connection sending section 38 deducts the fee according to the amount of content information based on the identified bank account.

The CORE connection sending section 34 is a unit which sends the content request information received by the RAN connection receiving section 31 to the network controller 60. The CORE connection receiving section 36 is a unit which receives the content information from the network controller 60. The IP packet receiving section 37 is a unit which receives the IP address or the content information from the DNS server 50 or the local content server 40, respectively.

Based on the content request information transferred from the base station controller 30, the local content server 40 delivers the content information corresponding with the content request information to the mobile terminal 10 via the base station controller 30.

The network controller 60 is equipment which relays data sent and received between the base station controller 30 and the general content server 70. The general content server 70 is equipment which delivers, based on the content request information transferred from the base station controller 30, the content information corresponding with the content request information to the relevant mobile terminal 10.

This general content server 70 is provided on the network 90 on the wide area network and connected to the network controller 60 through this network 90 on the wide area network. The general content server 70 and the network controller 60 are connected to the network 90 on the wide area network. However, the network controller 60 and the base station controller 30 are also connected to a network 90 supporting the GTP (GPRS Tunneling Protocol).

Note that the local content server 40 may include an address storing section 41 which stores the IP address of the mobile terminal 10 included in the content request information sent from the mobile terminal 10. The local content server 40 may deliver a content via the base station controller 30 to the IP address stored in the address storing section 41 when a predetermined period of time is elapsed.

(Method of Controlling Content Delivery Using Content Delivery System)

A method of controlling content delivery according to the content delivery system with the aforementioned configuration can be implemented by the following procedures.

(1) Procedure for Setting the Content Request Information

Figure 3:
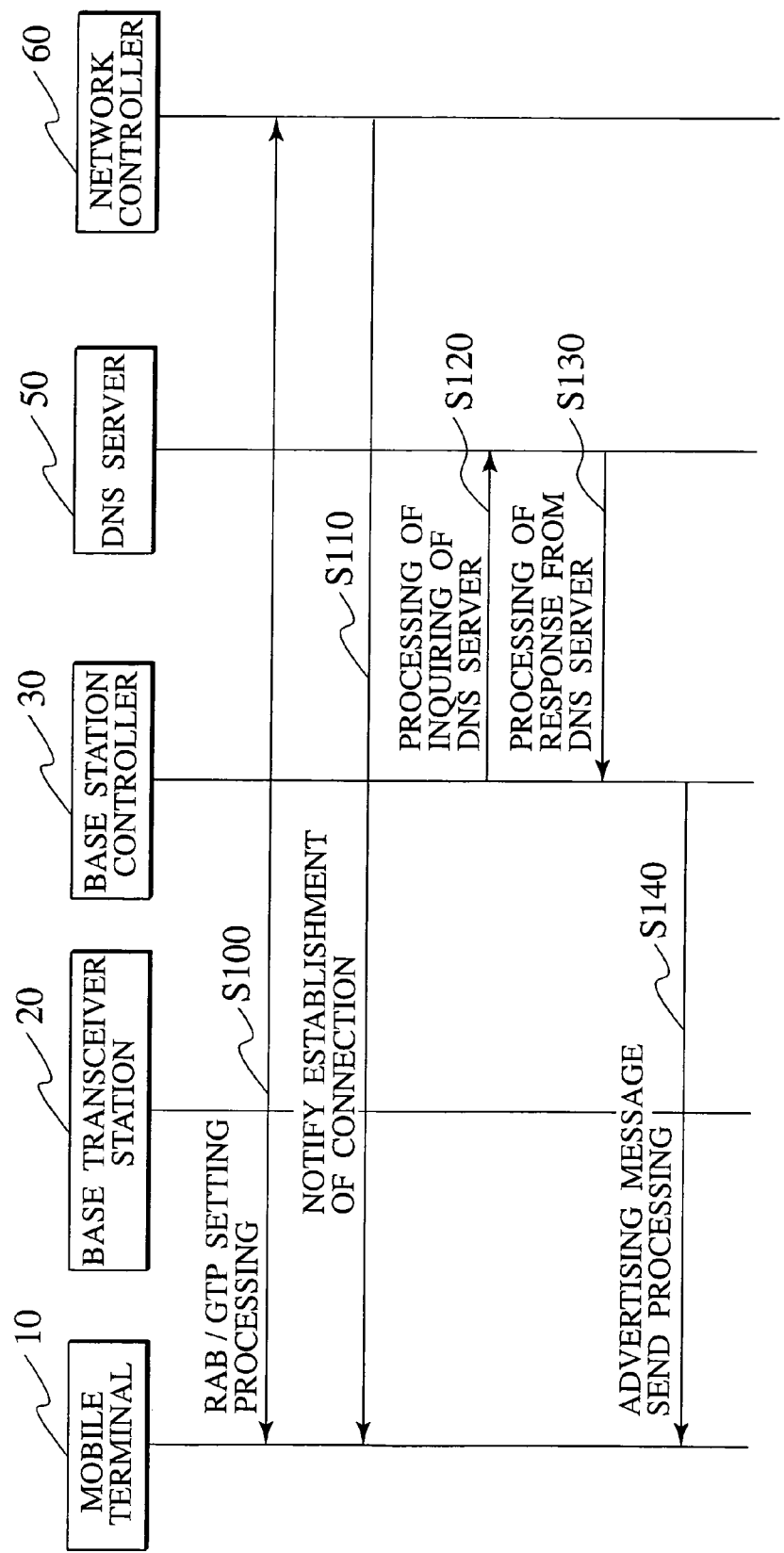
FIG. 3 is a chart showing a procedure for a mobile terminal setting content request information in the embodiment.

FIG. 3 is a chart showing a procedure for setting the content request information. As shown in FIG. 3, first, the mobile terminal 10 sends a connection request for communication connection, to the network controller 60 via the base transceiver station 20 and the base station controller 30 (S100). This connection request is request information in compliance with an Active PDP context Request message of the 3GPP standards.

This network controller 60 activates a setting procedure program compliant with the 3GPP standards based on the received connection request. The network controller 60 sets a RAB (Radio Access Bearer) between the network controller 60, the base station controller 30, the base transceiver station 20, and the mobile terminal 10 based on the activated setting procedure program. This RAB is an identifier to identify a channel through which data is sent and received between the mobile terminal 10 and the base station controller 30 and, at the same time, an identifier to identify an IP packet sent and received in the in-RAN network 80.

The network controller 60 sets the GTP between the base station controller 30 and the network controller 60. Herein, the GTP is an identifier to identify an IP packet sent and received between the base station controller 30 and the network controller 60.

Subsequently, as shown in FIG. 4, the base station controller 30 makes the RAN identifier of the set RAB and makes the CORE identifier of the set GTP to make the correspondence between these RAN identifier and CORE identifier in the RAN-CORE correspondence table.

Note that the base station controller 30 and the network controller 60 send and receive data by using the CORE identifier when sending and receiving data therebetween.

Herein, FIG. 5 is a table showing contents of the connection information corresponding with RAN identifiers. This connection information includes "use/not use", "sent of advertising messages", "accounting", and "others". The field "use/not use" indicates whether the RAN identifier is in use. The field "sent of advertising messages" indicates whether an advertising message has been delivered to the mobile terminal 10. The field "accounting" indicates whether the content information corresponding to the delivered advertising message has been charged for. The field "others" indicates other information.

As shown in FIG. 5, the base station controller 30 sets the field "use/not use" to "in use" when the RAN identifier is set in the process of the above S100. Moreover, the base station controller 30 sets the field "sent of advertising messages" to "not sent" since the base station controller 30 has not yet sent the advertising message to the mobile terminal 10.

Subsequently, the network controller 60 sends the mobile terminal 10 information indicating that the RAB has been set, that is, the connection has been established (S110). This information is information in compliance with an Active PDP context Accept message of the 3GPP standards.

The base station controller 30 refers to the table showing a list of IP addresses of local content servers 40 (see FIG. 6). When the IP address of an available local content server 40 is not set, this base station controller 30 inquires the IP address of the local content server 40 from the DNS server 50.

Specifically, the base station controller 30 reads a name of the local content server 40 from the correspondence table storing section 33. This base station controller 30 accesses the DNS server 50 corresponding to a predetermined IP address. Based on this read name, this base station controller 30 requests of the DNS server 50 the IP address of the local content server 40 corresponding to the name (S120), and acquires from the DNS server 50 the IP address of the local content server 40 corresponding to the request (S130). The base station controller 30 causes the correspondence table storing section 33 to store the acquired IP address of the local content server 40 (see FIG. 6).

Subsequently, the base station controller 30 sends the advertising message including the IP address of the local content server 40 to the relevant mobile terminal 10 using the above set RAN identifier (S140).

Herein, as shown in FIG. 8, the advertising message includes a "destination IP address", a "source IP address", a data type (type whether the message is an advertising message), and a "data section". The "destination IP address" identifies the mobile terminal 10 to which the advertising message is sent. The "source IP address" identifies the base station controller 30 which sends the advertising message. The "data section" indicates the IP address of the local content server 40. Note that the above "destination IP address" is set by the base station controller 30 when the RAN identifier is set.

The mobile terminal 10 receives the advertising message sent from the base station controller 30. The mobile terminal 10 sets the content request information using the received advertising message. The mobile terminal 10, as described later, acquires the content information of interest from the local content server 40 or the general content server 70, using the set content request information.

Herein, as shown in FIG. 8, the content request information includes a "destination IP address", a "source IP address", a data type (type whether the message is content request information), and a "data section". The "destination IP address" indicates the IP address of the destination of the content request information (IP address of the local content server 40 or of the general content server 70). The "source IP address" indicates the IP address of the source of the content request information (IP address of the mobile terminal 10). The "data section" indicates a content identifier to identify the content information to be requested.

(2) Procedure Until the Mobile Terminal 10 Acquires the Content Information Corresponding to the Content Request Information from the Local Content Server 40

Figure 9:
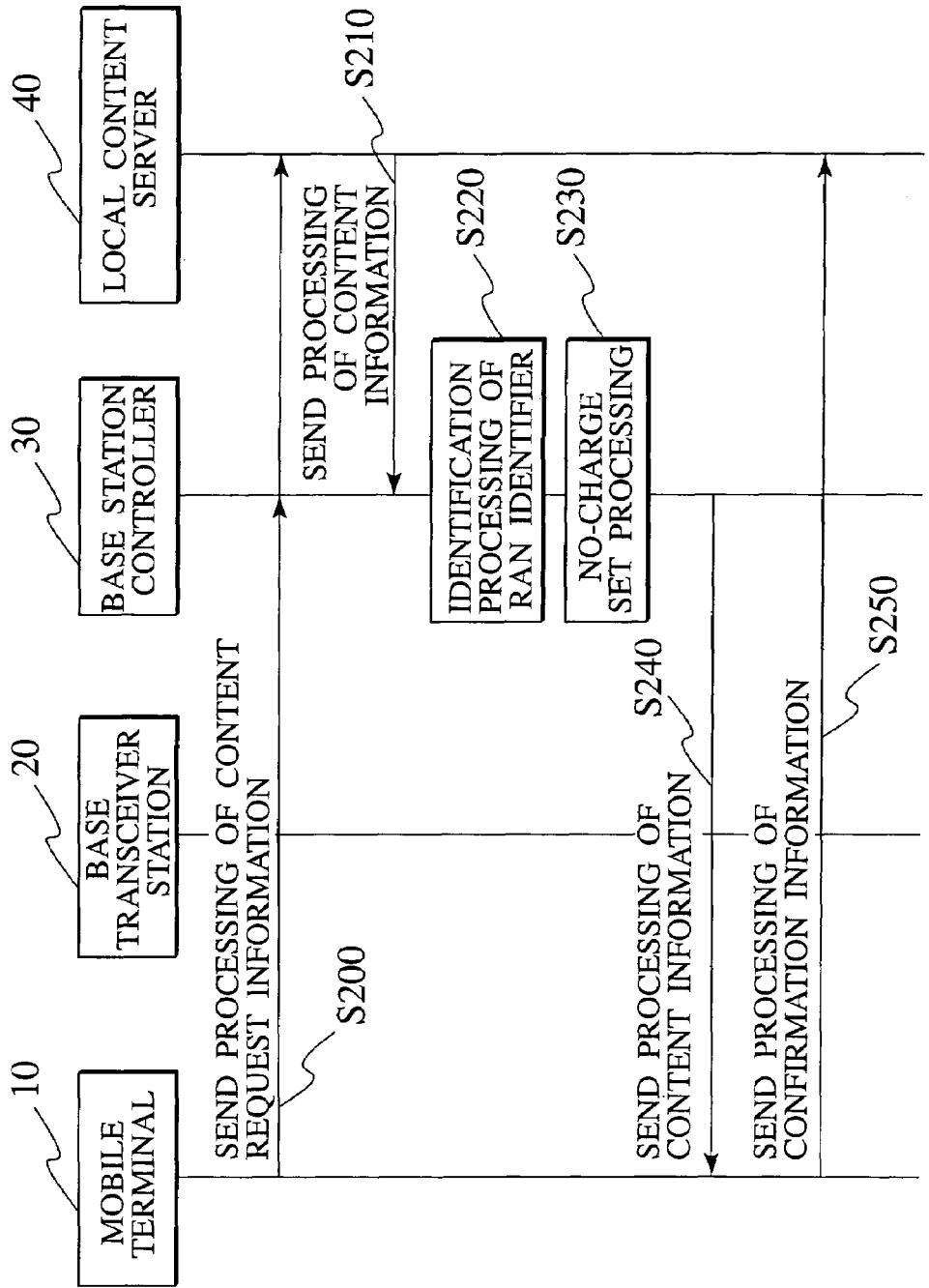
FIG. 9 is a chart showing a procedure until the mobile terminal acquires content information from the local content server in the embodiment.

FIG. 9 is a chart showing a procedure until the mobile terminal 10 acquires the content information corresponding to the content request information from the local content server 40. This procedure is performed after the procedure (1) is completed.

As shown in FIG. 9, first, the mobile terminal 10 sends the content request information to the base station controller 30 using the RAN identifier set in the procedure (1) (S200). This base station controller 30 performs the following processing based on the content request information received from the mobile terminal 10.

As shown in FIG. 2, the RAN connection receiving section 31 executes RAN protocol control processing in compliance with the 3GPP standards, such as MAC (Medium Access Control) and RLC (Radio Link Control), based on the received content request information.

This RAN connection receiving section 31 outputs the content request information which has been subjected to the processing, to the IP packet processing section 32. FIG. 10 is a view showing contents of a table which corresponds the IP address identifying the mobile terminal 10 as the source of the content request information with the RAN identifier set in the procedure (1). In the foregoing procedure (1), when sending the advertising message to the mobile terminal 10, the base station controller 30 sets the IP address to identify the mobile terminal 10 and the set RAN identifier in the above table while making the correspondence therebetween. This table is stored in the correspondence table storing section 33.

The IP packet processing section 32 which has received the content request information from the RAN connection receiving section 31 identifies the destination IP address (IP address to identify the mobile terminal 10) in the received content request information. When the identified destination IP address is not set in the table shown in FIG. 10, the base IP packet processing section 32 sets the identified destination IP address and the RAN identifier set in the procedure (1) in the above-mentioned table while making the correspondence therebetween.

Subsequently, when the IP packet processing section 32 can acquire the IP address of the local content server 40 which agrees with the destination IP address included in the content request information, the IP packet processing section 32 outputs the content request information to the IP packet sending section 35. This IP packet sending section 35 sends the inputted content request information to the relevant local content server 40.

Based on the received content request information, the local content server 40 acquires content data corresponding to the content request information from a data base inside. This content server 40 sends the content information including the acquired content data to the IP address of the source (IP address of the mobile terminal 10) included in the above content request information (S210).

At this time, the local content server 40 causes a memory to store the IP address of the source (IP address of the mobile terminal 10) included in the above content request information as an address record (see FIG. 11).

Herein, the content information includes the content data containing advertisement, the IP address (source IP address) of the local content server 40 which delivers the content data, and the IP address (destination IP address) of the mobile terminal 10 which receives the content data.

Subsequently, the base station controller 30 which has received the content information from the local content server 40 performs the following processing. Specifically, based on the destination IP address included in the received content information, the IP packet receiving section 37 acquires the RAN identifier which corresponds with the destination IP address (see FIG. 10) (S220).

When the source IP address included in the received content information agrees with the IP address of the local content server 40 set in advance, the IP packet receiving section 37 adds additional accounting information including accounting information of "no charge" to the content information, and outputs the content information to the RAN connection sending section 38. Herein, as shown in FIG. 12, the additional accounting information includes, for example, the RAN identifier, the accounting information, other control information, and the IP packet. This accounting information is information to identify whether the content is charged or not.

Subsequently, the RAN connection sending section 38 executes the MAC and RLC control processing. At this time, the RAN connection sending section 38 does not charge a fee since "no charge" is set in the inputted accounting additional information (see FIG. 5) (S230).

This RAN connection sending section 38 identifies the RAN identifier corresponding with the destination IP address by referring to the table of FIG. 10. The RAN connection sending section 38 sends control information concerning the MAC and RLC as well as the content information to the mobile terminal 10 (S240).

Based on the source IP address included in the content information, this mobile terminal 10 sends the base station controller 30 confirmation information indicating that the content information has been sent (S250). This confirmation information is constructed in a frame format which can be transferred in the RAN.

(3) Procedure Until the Mobile Terminal 10 Acquires the Content Information from the General Content Server 70 on the In-CORE Network 90

FIG. 13 is a chart showing a procedure until the mobile terminal 10 acquires content information from the general content server 70 on the in-CORE network 90. This procedure is performed after the procedure (1) is completed.

First, the mobile terminal 10 sends the content request information to the base station controller 30 using the RAN identifier set in the procedure (1) (S300). This base station controller 30 executes similar processing to the aforementioned processing to receive inbound packets.

In this case, when the IP address included in the content request information is the IP address of the general content server 70, the IP packet processing section 32 outputs the content request information to the CORE connection sending section 34.

This CORE connection sending section 34 refers to the RAN-CORE correspondence table (FIG. 4) and identifies the CORE identifier corresponding with the RAN identifier set in the procedure (1), based on the inputted content request information (S310). This CORE connection sending section 34 performs the GTP protocol processing using the identified CORE identifier and sends the content request information including GTP control information to the network controller 60 (S320). This network controller 60 sends the received content request information to the general content server 70.

The general content server 70 sends the content information corresponding with the received content request information to the CORE connection receiving section 36 (S330). This CORE connection receiving section 36 outputs the received content information to the IP packet receiving section 37.

Specifically, the CORE connection receiving section 36 identifies the RAN identifier corresponding with the destination IP address included in the content information by referring to the correspondence table of FIG. 10 (S340). Moreover, since the source IP address included in the content information is not the IP address of the local content server 40 in the RAN, the CORE connection receiving section 36 adds to the content information the additional accounting information including accounting information set to "charge" and the identified RAN identifier. This CORE connection receiving section 36 outputs the content information and the additional accounting information to the RAN connection sending section 38.

Based on the RAN identifier included in the inputted additional accounting information, the RAN connection sending section 38 refers to the connection information made to correspond to the RAN identifier and performs processing such as MAC and RLC processing to transfer the content information into the RAN.

Since the accounting information is set to "charge" in the inputted accounting additional information, the RAN connection sending section 38 charges a fee according to a packet size of the content information(S350). This RAN connection sending section 38 converts the inputted content information to a frame format which allows the content information to be transferred to the RAN, and sends the same to the mobile terminal 10.

Subsequently, similarly to the processing in the procedure (2), the mobile terminal 10 which has received the content information sends confirmation information for the received content information and the like to the general content server 70.

(4) Procedure in Which the Local Content Server 40 Sends the Content Information to the Mobile Terminal 10 Without a Request from the Mobile Terminal 10.

FIG. 14 is a chart showing a procedure in which the local content server 40 sends the content information to the mobile terminal 10 without a request from this mobile terminal 10. As shown in FIG. 14, the local content server 40 refers to an access terminal list (see FIG. 11) stored inside by a predetermined activation trigger managed by the local content server 40.

Examples of the activation trigger include a predetermined time, and a time interval between times when the local content server 40 sends the content information to the IP address of the mobile terminal 10, and the like.

This content server 40 sends the content information to the IP address of the mobile terminal 10 included in the access terminal list that is referred to (S400 to S440). This sending processing is the same as that in the procedure (2), and therefore details thereof are omitted.

According to the present invention of this application, the local content server 40 can deliver the content information to only the mobile terminal 10 connected to the RAN via the network 80 on the private network. Moreover, it is unnecessary for the operator that installs the local content server 40 to make settings to allow connection of the local content server 40 to the network 90 (CORE network) on the wide area network. Accordingly, the operator can reduce the period of time to complete the system.

When the IP address included in the content request information received from the mobile terminal 10 is the address of the local content server 40, the IP packet processing section 32 can transfer the content request information to the IP address. Accordingly, the content request information is not routed through the general content server 70 connected to the wide area network, so that the operator can allow the user not to pay a fee charged when the content request information is routed through the wide area network.

When the content information is delivered from the local content server 40, the RAN connection sending section 38 does not charge a fee for this content information. However, when the content information is delivered from the general content server 70, the RAN connection sending section 38 charges a fee according to an amount of content information.

Thus, the RAN connection sending section 38 charges a fee only for the content information delivered from the general content server 70, and therefore the operator of the local content server 40 can deliver the content information to the mobile terminal 10 at no fee.

The local content server 40 can deliver the content information to the mobile terminal 10 which has requested for access in the past when a predetermined period of time is elapsed.

Various modifications will become possible for those skilled in the art after receiving the teachings of the present disclosure without departing from the scope thereof.

What is claimed is:

1. A relay apparatus, which is connected to a first content server that is located on a private network and delivers various content, wherein the relay apparatus relays the content delivered by the first content server to a mobile terminal, the mobile terminal and the relay apparatus being connected to a radio network including a RAN (Radio Access Network), the relay apparatus comprising:
   a table setting section which sets, in accordance with an instruction from the mobile terminal, a table including (1) a radio connection identifier to identify a channel through which content is sent and received between the mobile terminal and the relay apparatus, and (2) an IP address with which the content is sent and received between the relay apparatus and the first content server;
   a receiving section which receives content request information from the mobile terminal; and
   a transfer section which transfers the content request information to an IP address included in the content request information when, based on the content request information received by the receiving section, (1) the radio connection identifier, and (2) the IP address included in the content request information are identified in the table set by the table setting section.

2. The relay apparatus according to claim 1, wherein
a second content server located on a wide area network and delivering the various contents is connected to the relay apparatus, and
the transfer section transfers the content request information to the second content server when, based on the content request information received by the receiving section, the IP address included in the content request information cannot be identified in the table set by the table setting section.

3. The relay apparatus according to claim 2, wherein
the relay apparatus does not charge a fee for the content when the content is delivered from the first content server, and charges a fee for the content according to an amount of the content when the content is delivered from the second content server.

4. The relay apparatus according to claim 1, wherein when the radio connection identifier is set between the relay apparatus and the mobile terminal through the radio network, the relay apparatus sends the IP address of the first content server to the mobile terminal.

5. A method of controlling content delivery, in a system in which a mobile terminal and a relay apparatus are connected to a radio network including a RAN (Radio Access Network), a first content server located on a private network and delivering various content is connected to the relay apparatus, and the first content server delivers the content to the mobile terminal via the relay apparatus, the method comprising:
a first step of setting, in accordance with an instruction from the mobile terminal, a table which includes (1) a radio connection identifier to identify a channel through which content is sent and received between the mobile terminal and the relay apparatus, and (2) an IP address with which the content is sent and received between the relay apparatus and the first content server;
a second step of receiving content request information from the mobile terminal;
a third step of transferring the content request information to the IP address included in the content request information when, based on the content request information received in the second step, the radio connection identifier and the IP address included in the content request information are identified in the table set in the first step; and
a fourth step of delivering the content corresponding to the content request information to the mobile terminal via the relay apparatus based on the content request information transferred in the third step.

6. A content delivery system in which a mobile terminal and a relay apparatus are connected to a radio network including a RAN (Radio Access Network), a first content server located on a private network and delivering various content is connected to the relay apparatus, and the first content server delivers the content to the mobile terminal via the relay apparatus, wherein
the relay apparatus includes:
a table setting section which sets, in accordance with an instruction from the mobile terminal, a table including (1) a radio connection identifier to identify a channel through which a content is sent and received between the mobile terminal and the relay apparatus, and (2) an IP address with which the content is sent and received between the relay apparatus and the first content server;
a receiving section which receives content request information from the mobile terminal; and
a transfer section which transfers the content request information to the IP address included in the content request information when, based on the content request information received by the receiving section, the radio connection identifier and the IP address included in the content request information are identified in the table set by the table setting section, and
wherein the first content server delivers the content corresponding to the content request information to the mobile terminal via the relay apparatus based on the content request information transferred from the transfer section.

* * * * *